US008650591B2

(12) United States Patent
Prieto

(10) Patent No.: US 8,650,591 B2
(45) Date of Patent: Feb. 11, 2014

(54) VIDEO ENABLED DIGITAL DEVICES FOR EMBEDDING USER DATA IN INTERACTIVE APPLICATIONS

(76) Inventor: Yolanda Prieto, Coral Gables, FL (US)

( * ) Notice: Subject to any disclaimer, the term of this patent is extended or adjusted under 35 U.S.C. 154(b) by 220 days.

(21) Appl. No.: 13/042,955

(22) Filed: Mar. 8, 2011

(65) Prior Publication Data

US 2011/0225610 A1    Sep. 15, 2011

Related U.S. Application Data

(60) Provisional application No. 61/311,892, filed on Mar. 9, 2010.

(51) Int. Cl.
*H04N 7/025*    (2006.01)

(52) U.S. Cl.
USPC .............................. 725/36; 725/34; 709/231

(58) Field of Classification Search
USPC ............................... 725/32–38; 709/217–232
See application file for complete search history.

(56) References Cited

U.S. PATENT DOCUMENTS

| 7,076,392 | B1 * | 7/2006 | Wilson | 702/119 |
| 8,024,768 | B2 * | 9/2011 | Berger et al. | 725/146 |
| 2008/0192736 | A1 * | 8/2008 | Jabri et al. | 370/352 |

* cited by examiner

*Primary Examiner* — Annan Shang
(74) *Attorney, Agent, or Firm* — Michael J. Buchenhorner

(57) ABSTRACT

Connecting viewers in the broadcasting and gaming experience for the purpose of enhancing the entertainment experience of a user is a fast growing technical area. It seeks to engage the viewer in a media that is visually rich which consequently provides a new and unique form of enhancing the user experience.

20 Claims, 3 Drawing Sheets

VIDEO ENABLED DIGITAL DEVICES FOR EMBEDDING USER DATA IN INTERACTIVE APPLICATIONS

CROSS-REFERENCE TO RELATED APPLICATIONS

This application claims priority from Provisional Patent Application No. 61/311,892, which is incorporated by reference herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of data base administration and more particularly relates to the field of altering index objects in tables.

BACKGROUND OF THE INVENTION

Vast research and implementation are currently underway to connect content from the Internet with active broadcast services. For example, by the use of widgets, content may be connected to services, thus synchronizing to programs selected by the user or viewer. Additionally, current technology provides viable means of searching, within a data stream and metadata, objects of interest which further allows the capability of editing, substituting, and enhancing the identified data in the original. data stream or metadata.

SUMMARY OF THE INVENTION

Briefly, according to an embodiment of the invention a method for generating an edited video data stream from an original video stream wherein generation of said edited video stream comprises a step of: substituting at least one object in a plurality of objects in said original video stream by at least a different object. According to another embodiment, an interactive broadcast TV system enhances the user experience by allowing said user the capability of providing his/her object data for use in the substitution of an object data in a broadcast video by said user object data.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
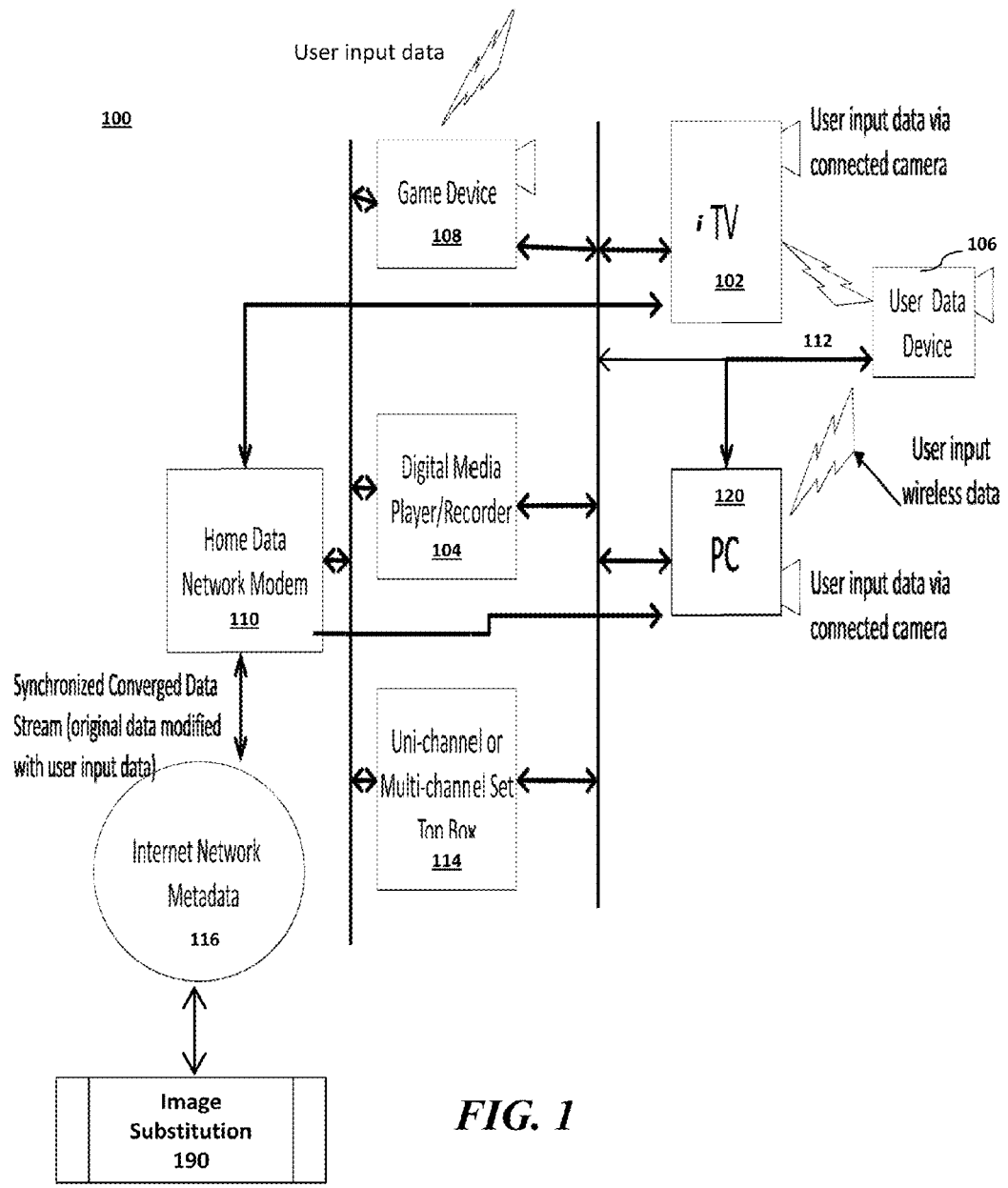
FIG. 1 shows a block diagram of a digital system, according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Referring to FIG. 1, we discuss a video enabled input digital device such as an interactive television ("i TV") 102, camcorder 104, camera-enabled personal device 106, gaming device 108, and the like, which is operable for taking a captured video to be uploaded, or inputted by a user, for the purpose of inserting the video content into another video, graphics, image sequence selected by the user. This produces a new video sequence 190 which is subsequently broadcasted or played by the digital device. In addition to video, the user may insert any digital data such as text, audio, or images, to personalize the metadata 116 that has been created resulting from the synchronization of Internet content with broadcast data. In this embodiment the internet network is capable of editing the metadata 116 in order to insert the user input data to generate a synchronized converged data 190.

For example, the user may have a video sequence which he/she desires to insert in place of an actress or particular avatar in a game or broadcast for the purpose of having a participative experience in the game or broadcast program. The user will have the capability of choosing and informing the video enabled digital device which actor, avatar, background, or region of the viewing data to be displayed he or she desires to edit, enhance or substitute with the user provided data.

In one embodiment of this invention, the digital device is enabled with a camera input which may be hardware connected to the device or wirelessly connected to said digital device. The digital device may be at least a digital TV, a gaming console, a digital media player/recorder, or set top box, which may co-exist as part of a network with the capability of all being connected to a network via the Internet. The connections may be wired, wireless, further managed by an in-home broadcast network or a home data network. The digital device is capable of receiving image, video, or text data from a user wirelessly, or the device itself is image enabled with a mounted imaging device.

Once the digital device receives the user input signal, which may be in the form of an image, video, graphics, text, or any other digital data form, the digital device may further process the image to enhance it, compress it, or otherwise modify it to make it compatible with the digital device's data requirements. The digital device's processed input data is then sent through shared connections to a system that supports internet services, TV broadcast services, gaming services, e-book services, in-home data net leading to a converged IP network solution where content and services provided by these services may be unified and synchronized to provide a converged interfaced data such that the user input is also merged.

Figure 3:
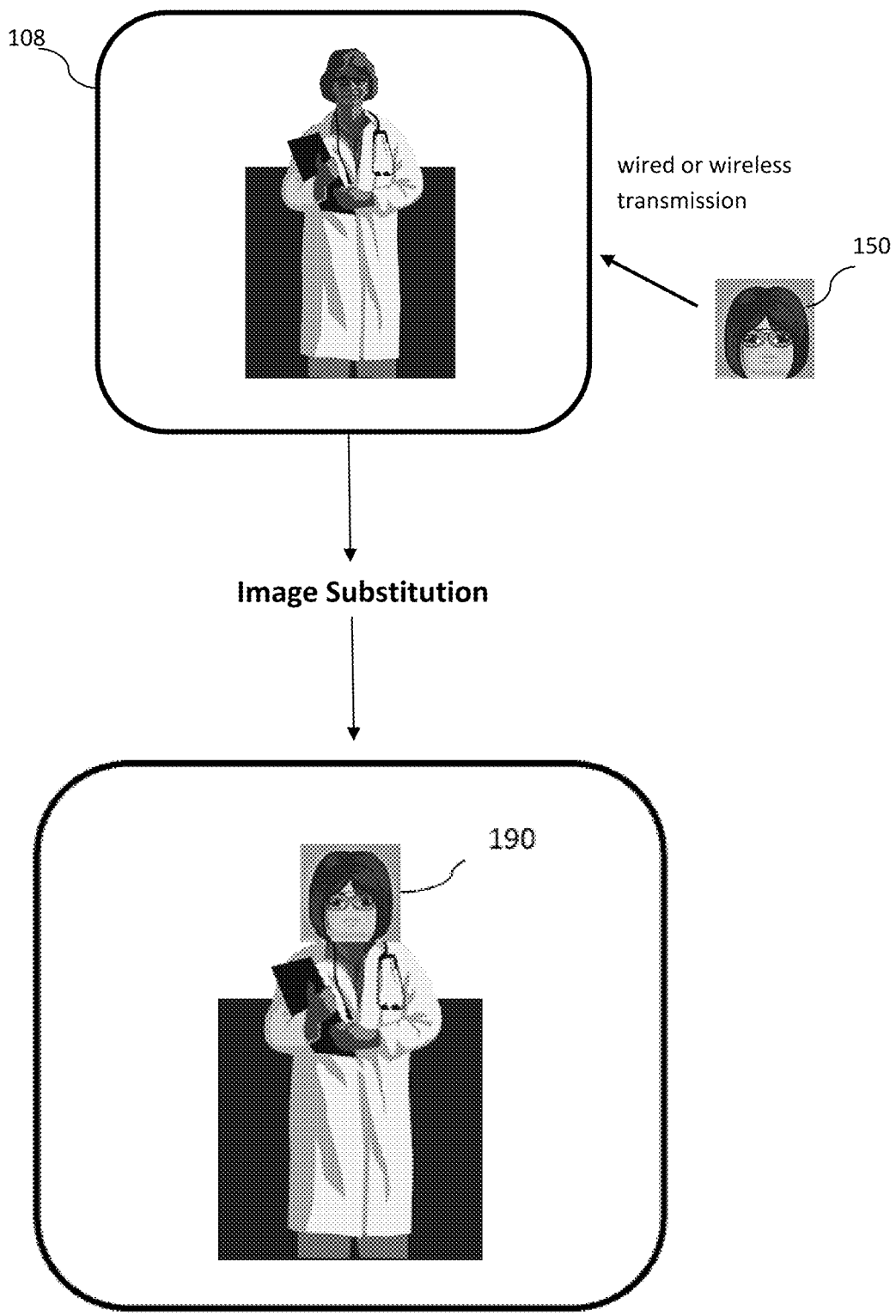
FIG. 3 shows a simplified illustration of a video image substitution on a gaming device, according to an embodiment of the invention.

An application of this embodiment is to provide the user with the enhanced experience of viewing himself as part of a broadcast show which he may subsequently desire to record via the digital media recorder. Such a network system allows the digital device to transmit the user's request and data to a network where his request is processed and his data inserted per the instruction provided by the user into the video data that is to be broadcast. Referring now to FIG. 3 we show a user input 150 of a photo image of the user used to replace the face of the image shown on the device 108. The user transmits the photo image 150 by wired or wireless means to the device 108. The image substitution is performed and the device 108 shows the substituted image 190.

Another embodiment of this invention allows for a stand-alone digital device to receive input digital data from a user or from a wired or wireless imaging device for the purpose of creating a modified converged data stream processed by the input device such that said converged data stream is the result of the input device's original stream modified by the user inputted or imaging device inputted data. One application of this embodiment can be a gaming device where the user enters a video or image of himself for its immersion into a game or graphics data stream that has been created by the imaging device. Said imaging device is capable of receiving the user's data wirelessly or through a camera or video device that may be part of the digital device.

The resulting converged data stream will then contain the user's image data in the game data. This will allow the user to become part of the game with his or her data image. The user's input data, which may be an image or video of himself, is added to a particular structure that is denoted by the user. The user inputted data will contain, in addition to the user image data, instructions to indicate which actor, avatar, or structure the user will like to have his data incorporated into. In this example, the resulting graphics or video game is one in which the viewer will see his image as part of the game.

The received digital data form is additionally formatted such that an instruction is conveyed in the message data to explain how and where the digital data is to be inserted into the converged interface data. This process requires the input device to perform video, image analysis and processing in order to recognize the actor or structure the user requests to have substituted by his inputted data. The process further requires the steps of background analysis, face detection and recognition, image and video motion detection and analysis to follow through the input device's motion sequence with the user's inputted data to produce a resulting stream where the user inputted data becomes part of the input device's stream as if it were originally its own.

In FIG. 1 the User Data Device (UDD) 106 is an image capable digital device enabled with wired and wireless communication capability. Further, the UDD 106 is capable of performing at least the following functions: image and video capture, graphics processing, image and video processing such as image and video enhancements, data compression, data storage, data displaying, receiving and transmitting digital data from other and to other devices respectively. An example of UDD's input can be image or video data. Additionally the UDD 106 can consist of a data entry means 112 that allows the user to specify a set of instructions that indicate how the input data is to be manipulated. One goal is to generate an output data stream that consists of the input data plus a set of instructions that indicates to another receiving device such as a PC 120, a TV 102, or a gaming device 108, how the input data is to be used or embedded in an existing stream of the receiving device.

The UDD 106, TV 102, PC120, Game Device (GD) 108, unichannel and multi-channel set top box 114 (STB), digital media player/recorder 104 (DMPR) are all capable of compressing, decompressing, and transcoding data for those image, video, and graphic formats that need conversion to another coding standard.

Consider the case where the input data is a video sequence of a user which the user desires to embed in a broadcast TV program. The user desires to enhance his or her experience by viewing a modified broadcast program which substitutes his image as a substitute for an actor or actress in the original broadcast program. The data path here defined in this example is not limited to this particular data flow; instead, it is intended to show a capability in the system shown in FIG. 1. The user image or video data can be captured by the UDD device 106 and transmitted wired or wireless to a television 102 (TV). In addition to the captured user image data, the user sends to the TV instructions regarding which actor, actress, or structure item he desires to replace or substitute in the original program. The user image data can be in a compressed data format prior to transmission to the TV 102.

Since the TV 102 may also be image and video enabled, the user may select to use the TV camera input to capture the desired video data rather than using the UDD 106. In this case, the TV 102 may be equipped with the appropriate entry means to allow the user to enter the appropriate instructions regarding how the user input video is to be embedded in the existing broadcast data sequence. The embedding instructions and the user input video data are then transmitted to a home data network modem 110 (HDNM) that has access to internet network metadata 116. The metadata 116 itself contains program information that is transmitted or broadcasted by the TV 102. The internet network devices have the capability of processing the user image or video data and the set of instructions that indicate how said user input data is to be embedded into the metadata 116 to produce a modified broadcast bit stream.

To accomplish the embedding process, the internet network devices are capable of performing at least the following functions: receiving user input data and instructions, performing image and video analysis such as face recognition and detection, image and video data portioning, image and video enhancement, filtering, texture analysis, data compression and decompression, motion detection and estimation, motion correction to adapt the motion of the user input sequence with that of the original metadata to be broadcasted, error analysis, etc. Once the user input data has been correctly embedded into the data to be broadcasted, the internet network devices send the resulting modified data to the TV 102 to be broadcast.

A similar data flow may be configured using for example a gaming device 108 instead of a television 102. In this configuration the metadata 116 in the internet network consists of graphics data rather than broadcast data.

It is evident that each of the equipments or devices in FIG. 1 may have the capability of on-the-fly or off-line modifying for the user input data as stand-alone devices. This implies that in this type of configuration there is no need to access the metadata in the Internet network. Instead, the received user input data can be processed by the particularly user enabled device to produce a modified bitstream that contains the embedded user defined input data substituting the portion of the original data stream with the user input data as specified by the user. For these stand alone devices the interface from the user can be through the UDD, or the user input data can be captured directly by the stand alone device.

The stand alone devices can be equipped with image or video capturing means, data entry devices such as a keyboard, displaying devices, wired and wireless communicating means for receiving and transmitting user input data and instructions, memory storage, computing devices, data manipulation capabilities such as performing image and video analysis such as face recognition and detection, image and video data portioning, image and video enhancement, filtering, texture analysis, data compression and decompression, motion detection and estimation, motion correction to adapt the motion of the user input sequence with that of the original metadata to be broadcasted, error analysis, data transcoding such as converting a particular codec standard to another in order to conform the image captured data to the particular standard in the stand alone device.

In another embodiment of this invention the user is capable of generating a set of programming instructions or widgets for the purpose of blending the user defined video with the metadata 116 or internet content, whereby the internet network devices are capable of interpreting said set of instructions to produce a modified synchronized converged data stream. The programming instructions can be stored in a computer readable storage medium such as a CDROM or DVD-ROM, or other suitable media device. The user defined data that has been attached to the programming instructions is embedded in the original metadata to create the modified synchronized converged data stream. A PC 120, connected as shown in FIG. 1, may be used to produce the set of programming instructions and for attaching the user input data to the set of instructions. In the configuration where the stand alone devices are used independently of the internet content metadata 116, the PC transmits the user data and programming instructions directly to the stand-alone device configuration for further processing as described in the paragraph above.

Figure 2:
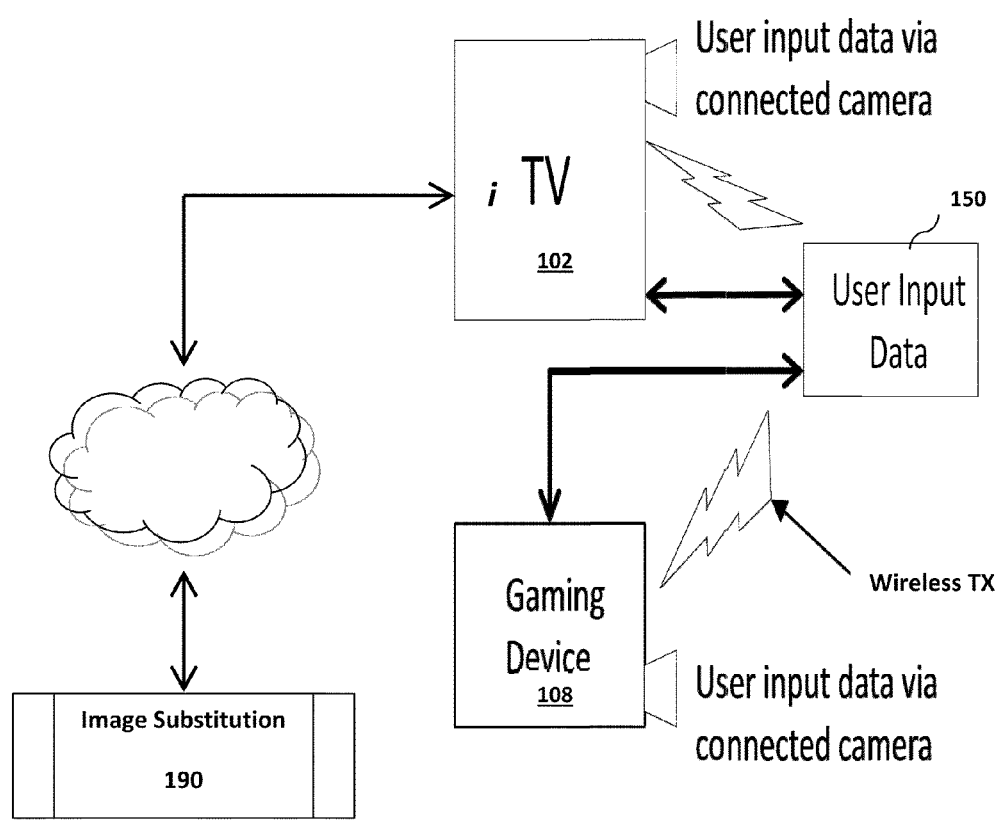
FIG. 2 shows a block diagram of a television and gaming device, according to an embodiment of the invention.

Another embodiment of this invention is shown in FIG. 2. Consider the example where the user desires to embed his or her created avatar, image, 2-dimensional (2-D) or three-dimensional (3D) video sequence, graphics sequence, or another form of digital input data 150 into an existing video game to create a modified converged new sequence for display. The user is capable of modifying and thus personalizing the existing video game according to his or her preferences. The user can even generate a set of programming instructions or widgets for the purpose of blending the user defined input data 150 with the existing graphics data in the gaming device 108. Said programming instructions and user data may be transmitted wired or wirelessly to the gaming device via a PC 120 or a user input data device 106.

The gaming device 108, TV 102, set-top box 114, user input data device 106 may be equipped with a data entry device 112 such as but not limited to: a keyboard, optical reader, scan device, display capability and device, projection capability and device, wired and/or wireless communication capability and device, internet network capability, memory storage. The device 108 has computing means to perform data manipulation capabilities such as performing image and video analysis such as face recognition and detection, image and video data portioning, image and video enhancement, filtering, texture analysis, data compression and decompression, motion detection and estimation, motion correction to adapt the motion of the user input sequence with that of the original graphical data of the gaming device, error analysis, data transcoding such as converting a particular codec standard to another in order to conform the image captured data to the particular standard in the stand alone device. In the case where a user inputs a video sequence 150 into an interactive TV 102, the video data 150 is transmitted via the Internet to a server or broadcast station where the image substitution 190 takes place. The substituted image is then broadcast back to the TV 102.

The embodiments described in this invention use mainly video or images as the user defined input. However, user defined input for embedding in an existing data format to create the user experience that he or she desires is not limited to video or image data that has been captured by the user. It may consist of sequences that may have been previously downloaded for the internet or other sources. It may additionally consist of text data, voice data, sound data, a new background that permits modifying the viewing scene which is to be broadcasted or displayed by a stand-alone device for the purpose of personalizing his or her viewing experience.

Another embodiment of this invention allows the user to embed his or her voice or a user selected voice and substitute it for a voice already in a video broadcast, a game, a graphics sequence, or a digital device such as a talking e-book. It is then a requirement that all these stand alone devices as well as the internet network devices are capable of performing voice recognition, voice and audio processing to allow embedding a new audio or speech and substituting it for another existing voice.

Referring again to FIG. 2 there is shown an embodiment presenting examples of digital input devices which are capable of merging the user input data into their original streams to produce a modified converged stream 190 according to the user demands and the user's provided data.

What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of media actually used to carry out the distribution. Examples of media include ROMs, DVD-ROMs, and transmission-type media, such as digital and analog communication links, wired or wireless communications links using transmission forms, such as, for example, radio frequency and light wave transmissions. The media make take the form of coded formats that are decoded for use in a particular data processing system.

This invention may be easily adapted to hand-held or portable devices: Prompting is especially useful for small hand-held devices, such as cell phones, which would otherwise require (non-intuitive) complex or multiple fields, screen displays, etc. Alternatively, the device can "walk" or "guide" the user through using friendly intuitive methods—prompting the user for appropriate responses or programmed to anticipate (learning the -end-user's habits and behaviors) the most commonly used keyword identifiers and defaulting as such by default so as to minimize the questioning and prompting. This can be done by auto-generating the data in the fields. This provides for a more user friendly and intuitive interface and a more pleasant experience for a user. Otherwise, a longer learning curve is required if the same were used with multiple other specialized fields and/or screens for each possible scenario or behavior that would be required for each keyword that may be entered in addition to ordinary data when one or multiple like or differing fields are simultaneously displayed or maintained in either the foreground or background.

When using less definitive means of entering data and commands where the user is more detached from the electronic or computing device, there is a further need for the user to be able to easily indicate and the computer or device to recognize obscurity or ambiguous entries that may have multiple meanings and to delineate and confirm, either though solicitation or for the user to indicate using more explicit means, whether data is to be interpreted as a function, command or simply as ordinary data.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

I claim:

1. An interactive media apparatus for generating a displayable edited video data stream from an original video data stream, wherein at least one pixel in a frame of said original video data stream is digitally extracted to form a first image, said first image then replaced by a second image resulting from a digital extraction of at least one pixel in a frame of a user input video data stream, said apparatus comprising:
   an image capture device capturing the user input video data stream;
   an image display device displaying the original video stream;
   a data entry device, operably coupled with the image capture device and the image display device, operated by a user to select the at least one pixel in the frame of the user input video data stream to use as the second image, and further operated by the user to select the at least one pixel to use as the first image;
   wherein said data entry device is selected from a group of devices consisting of: a keyboard, a display, a wireless communication capability device, and an external memory device;
   a digital processing unit operably coupled with the data entry device, said digital processing unit performing:
      identifying the selected at least one pixel in the frame of the user input video data stream;
      extracting the identified at least one pixel as the second image;
      storing the second image in a memory device operably coupled with the interactive media apparatus;
      receiving a selection of the first image from the original video data stream;
      extracting the first image;
      spatially matching an area of the second image to an area of the first image in the original video data stream, wherein spatially matching the areas results in equal spatial lengths and widths between said two spatially matched areas; and
      performing a substitution of the spatially matched first image with the spatially matched second image to generate the displayable edited video data stream from the original video data stream.

2. The interactive media apparatus of claim 1 wherein the digital processing unit is further capable of performing:
   computing motion vectors associated with the first image; and
   applying the motion vectors to the second image extracted from the user input video data stream, wherein the generated displayable edited video data stream resulting from the substitution maintains an overall motion of the original video data stream.

3. The interactive media apparatus of claim 1 wherein the digital processing unit is further capable of extracting the at least one pixel from the user entering data in the data entry display device.

4. The interactive media apparatus of claim 3 wherein the digital processing unit is further capable of extracting the at least one pixel from the user pointing to a spatial location in a displayed video frame.

5. The interactive media apparatus of claim 1 wherein the digital processing unit is further capable of extracting the at least one pixel from the user selecting from a displayed list of items identifying content in the video.

6. The interactive media apparatus of claim 1, wherein the second image is transmitted wirelessly to the interactive media apparatus.

7. The interactive media apparatus of claim 1 wherein the digital processing unit is capable of processing video games.

8. The interactive media apparatus of claim 1, wherein the substitution performed by the digital processing device replaces at least a face of a first person from the original video data stream by at least a face of a second person from the user input video data stream.

9. The interactive media apparatus of claim 1 further comprising an audio processing unit performing audio processing corresponding to the video data streams.

10. The interactive media apparatus of claim 9, wherein the audio processing unit is additionally capable of performing audio processing to replace audio corresponding to the first image in the original video stream with audio corresponding to the second image in the user input video data stream.

11. A method for generating a displayable edited video data stream from an original video data stream, wherein at least one pixel in a frame of the original video data stream is digitally extracted to form a first image, said first image then replaced by a second image resulting from a digital extraction of at least one pixel in a frame of a user input video data stream, said method comprising:
   capturing a user input video data stream by using a digital video capture device;
   using a data entry device operably coupled with the digital video capture device and a digital display device, selecting the at least one pixel in the frame of the input video data stream;
   wherein the data entry device is selected from a group of devices consisting of: a keyboard, a display, a wireless communication capability device, and an external memory device; and
   using a digital processing unit operably coupled with the data entry device, performing:
      identifying the selected at least one pixel in the frame of the input video stream;
      extracting the identified at least one pixel as the second image;
      storing the second image in a memory device operably coupled with the digital processing unit;
      receiving a selection of the first image from the user operating the data entry device;
      extracting the first image from the original video data stream;
      spatially matching an area of the second image to an area of the first image in the original video data stream, wherein spatially matching the areas results in equal spatial lengths and widths between said two spatially matched areas;
      performing a substitution of the spatially matched first image with the spatially matched second image to generate a the displayable edited video data stream from the original video data stream;
      computing motion vectors associated with the first image; and applying the motion vectors to the second image, wherein the generated displayable edited video data stream resulting from the substitution maintains an overall motion of the original video data stream.

12. An interactive media apparatus in an internet enabled broadcast network system for generating a displayable edited video data stream from an original broadcast video data stream, wherein at least one pixel in a frame of the original broadcast video data stream is digitally extracted to form a first image, said first image is substituted by a second image resulting from a digital extraction of at least one pixel in a frame of a user input video data stream, said apparatus comprising:
   an image capture device capturing a user input video data stream;
   an imaging processing device, operably coupled with the image capture device, digitally processing the captured user input video data stream;
   a signal processing device receiving an original broadcast video data stream from a broadcast station;
   a data entry device, operably coupled with the image capture device and the image processing device, wirelessly transmitting to the signal processing device in the interactive media apparatus user embedded instructions, wherein said user embedded instructions are used by said signal processing device for:
      identifying the first image in the original broadcast video data stream; and
      identifying the second image in the user input video data stream;
   a digital processing unit performing:
      detecting the second image from the user input video data stream, as identified by the user, according to the wirelessly received user embedded instructions;
      extracting the second image from the user input video data stream;
      storing the second image in a memory device operably coupled with the interactive media apparatus;
      detecting the first image from the original broadcast video data stream, as identified by the user, according to the wirelessly received embedded instructions;
      extracting the first image from the original broadcast video data stream;
      spatially matching an area of the second image in the user input video data stream with an area of the first image in the original broadcast video data stream, wherein spatially matching results in equal spatial lengths and widths between the spatially matched areas; and
      substituting the spatially matched first image with the spatially matched second image to generate the displayable edited video data stream from the original broadcast video data stream.

13. The interactive media apparatus of claim 12 wherein the digital processing unit is capable of performing:
   computing motion vectors associated with first image extracted from the original broadcast video data stream; and
   applying the motion vectors to the second image extracted from the user input video data stream, wherein the generated new displayable edited video data stream resulting from the substitution step contains the overall motion of the original broadcast video data stream.

14. The interactive media apparatus of claim 12, wherein the user input video data stream is captured by an imaging capture device internal to the apparatus.

15. The interactive media apparatus of claim 12 comprising an audio processing unit, wherein the audio processing unit performs audio processing to replace audio corresponding to the first image in the original broadcast video stream with audio corresponding to the second image in the user input video data stream.

16. The interactive media apparatus of claim 12, wherein the signal processing device for receiving an original broadcast video data stream receives the data stream by means of a user specific internet address.

17. An interactive system in an internet enabled broadcast network system for generating a displayable edited video data stream from an original broadcast video data stream, wherein at least one pixel in a frame of the original broadcast video data stream is digitally extracted to form a first image, said first image is substituted by a second image resulting from a digital extraction of at least one pixel in a frame of a user input video data stream, said interactive system comprising:
   a video imaging capture device capturing the user input video data stream;
   a signal processing device operably coupled with the video imaging capture device, said signal processing device receiving, by means of a user specific internet address, the original video data stream from a broadcast station;
   a data entry device operably coupled with the signal processing device, operated by a user to identify the at least one pixel in the frame of user input video data stream;
   wherein the data entry device is selected from a group of devices consisting of: a keyboard, a display, a wireless communication device, and an external memory device;
   a digital processing unit configured to perform:
      detecting the second image in the captured user input video data stream, as identified by the user by means of the data entry device;
      extracting the second image form the captured user input video data stream;
      storing the second image in a memory device operably coupled with the interactive system;
      detecting the first image in the original broadcast video data stream, as identified by the user by means of the data entry device;
      extracting the first image from the original broadcast video data stream;
      spatially matching an area of the second image in the user input video data stream with an area of the first image in the original broadcast video data stream, wherein the spatial matching results in equal spatial lengths and widths between the two spatially matched areas; and
      substituting the spatially matched first image with the spatially matched second image to generate the displayable edited video data stream from the original broadcast video data stream.

18. The interactive system of claim 17, wherein the digital processing unit is capable of performing:
   computing motion vectors associated with first image extracted from the original broadcast video data stream; and
   applying said motion vectors to the second image extracted from the user input video data stream, wherein the generated new displayable edited video data stream resulting from the substitution step contains the overall motion of the original broadcast video data stream.

19. The interactive system of claim 17 comprising an audio processing unit, wherein the audio processing unit performs audio processing to replace audio corresponding to the first image in the original broadcast video stream with audio corresponding to the second image in the user input video data stream.

20. The interactive system of claim 17, wherein the digital processing unit is capable of extracting the at least one pixel in a frame of a video resulting from the user entering data in a data entry display device.

\* \* \* \* \*